(12) United States Patent
Chen et al.

(10) Patent No.: US 8,279,924 B2
(45) Date of Patent: Oct. 2, 2012

(54) QUANTIZATION PARAMETER SELECTIONS FOR ENCODING OF CHROMA AND LUMA VIDEO BLOCKS

(75) Inventors: Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 891 days.

(21) Appl. No.: 12/390,325

(22) Filed: Feb. 20, 2009

(65) Prior Publication Data
US 2010/0086025 A1  Apr. 8, 2010

Related U.S. Application Data
(60) Provisional application No. 61/102,622, filed on Oct. 3, 2008.

(51) Int. Cl.
*H04N 7/26* (2006.01)
(52) U.S. Cl. .................................. 375/240.03
(58) Field of Classification Search ............. 375/240.22; 348/27, 405.1
See application file for complete search history.

(56) References Cited

U.S. PATENT DOCUMENTS
| | | | |
|---|---|---|---|
| 2002/0159521 A1* | 10/2002 | Yan et al. | 375/240.03 |
| 2005/0180500 A1* | 8/2005 | Chiang et al. | 375/240 |
| 2006/0256856 A1* | 11/2006 | Koul et al. | 375/240.03 |
| 2008/0279466 A1* | 11/2008 | Yang | 382/246 |

FOREIGN PATENT DOCUMENTS
EP  1835750  9/2007

OTHER PUBLICATIONS
JVT: "Draft ITU-T Recommendation and Final Draft International Standard of Joint Video Specification (ITU-T Rec. H.264 ISO/IEC 14496-10 AVC)" Joint Video Team (JVT) of ISO/IEC MPEG & ITU-T VCEG( ISO/IEC JTCI/SC29/WG11 and ITU-T SG16 Q6), No. JVT-G050r1, May 27, 2003, XP030005712.
Zhenzhong Chen et al: "Towards Rate-Distortion Tradeoff in Real-Time Color Video Coding" IEEE Transactions on Circuits and Systems for Video Technology, vol. 17, No. 2, Feb. 1, 2007, pp. 158-167, XP011161866.
International Search Report and Written Opinion—PCT/US2009/058849, International Search Authority—European Patent Office—Oct. 3, 2010.
Richardson, H.264 and MPEG-4 Video Compression, John Wiley & Sons Ltd, 2003.
Information Technology—Coding of Audio-Visual Objects—Part 10: Advanced Video Coding, ISO/IEC 14496-10:2005.
Karczewicz et al., "Rate Distortion Optimized Quantization," ITU COM 16-C 462-E, Apr. 2008.

* cited by examiner

*Primary Examiner* — Matthew Smithers
(74) *Attorney, Agent, or Firm* — John G. Rickenbrode (57) ABSTRACT

This disclosure describes rules that may be applied during block-based video coding to ensure that quantization parameter selections for luma blocks will not adversely affect the quality of chroma blocks. In accordance with this disclosure, rate-controlled video encoding occurs in which quantization parameter changes in luma blocks are pre-evaluated to determine whether such quantization parameter changes in luma blocks will also cause quantization changes for chroma blocks. If quantization parameter changes in the luma blocks will also cause quantization changes for chroma blocks, then that quantization parameter change for luma blocks may be skipped and not evaluated. In this way, secondary effects of quantization parameter changes in the luma blocks (with respect to the chroma blocks) can be avoided.

40 Claims, 3 Drawing Sheets

QUANTIZATION PARAMETER SELECTIONS FOR ENCODING OF CHROMA AND LUMA VIDEO BLOCKS

CROSS-REFERENCE TO RELATED APPLICATIONS

This application claims the benefit of U.S. Provisional Application 61/102,622 filed Oct. 3, 2008, the entire content of which is incorporated herein by reference.

TECHNICAL FIELD

This disclosure relates to block-based video encoding used to compress video data, and quantization techniques associated with block-based video encoding.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Block-based video compression techniques may perform spatial prediction and/or temporal prediction. Intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to encode video information based the movement of corresponding video blocks of two or more adjacent coded units.

Video blocks may include luminance (luma) blocks and chrominance (chroma) blocks. A 16-by-16 block of pixels, for example, may be represented by four 8-by-8 luma blocks and two sub-sampled 8-by-8 chroma blocks. Block-based coding may occur with respect to each of these different video blocks. In video coding, the YCbCr color space is commonly used, in which Y represents the luma component and Cb and Cr represent two different chroma components of a block of pixels. Given a 16-by-16 block of pixels, four 8-by-8 Y blocks, one sub-sampled 8-by 8-Cb block, and one sub-sampled 8-by-8 Cr block may be used to represent the 16-by-16 block of pixels, and block based coding may occur for each of these video blocks. The term "macroblock" is sometimes used to refer to a set of four 8-by 8-Y blocks, one sub-sampled 8-by-8 Cb block, and one sub-sampled 8-by-8 Cr block that collectively define a 16-by-16 block of pixels. In some formats, macroblocks can be partitioned into other luma and chroma block sizes, and may define even finer block-partitions such as 2-by-2 blocks, 2-by-4 blocks, 4-by-2 blocks, 4-by-4 blocks, 4-by-8 blocks, 8-by-4 blocks, and so forth.

A coded video block may be represented by prediction information that can be used to create or identify a predictive block, and a residual block of data indicative of differences between the block being coded and the predictive block. In the case of inter-coding, one or more motion vectors are used to identify the predictive block of data (typically from a previous or subsequent video frame of a video sequence), while in the case of intra-coding, the prediction mode may define how the predictive block is generated based on data within the same frame or other coded unit. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction, the video encoder may apply transform, quantization and entropy coding processes to further reduce the bit rate associated with communication of a residual block. Transform techniques may comprise discrete cosine transforms or conceptually similar processes, wavelet transforms, integer transforms, or other types of transforms. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

SUMMARY

In general, this disclosure describes quantization parameter selection techniques that may be used during block-based video encoding. This disclosure recognizes and accounts for secondary effects that quantization parameter selections for luma blocks can have on the quantization of chroma blocks. This disclosure proposes rules that may be applied during block-based video encoding to ensure that quantization parameter selections for luma blocks will not adversely affect the quality of chroma blocks.

In one example, this disclosure describes a method of encoding video data. The method comprises testing a first quantization parameter with respect to a set of video blocks for rate-distortion performance in video encoding, wherein the set of video blocks include luma blocks and chroma blocks, adjusting the first quantization parameter to a second quantization parameter, and determining whether the second quantization parameter causes an undesirable quantization change for the chroma blocks relative to the first quantization parameter. The method also comprises testing the second quantization parameter with respect to the set of video blocks for rate-distortion performance in the video encoding if the second quantization parameter does not cause the undesirable quantization change for the chroma blocks. In addition, the method comprises skipping testing of the second quantization parameter with respect to the set of video blocks for rate-distortion performance in the video encoding if the second quantization parameter does cause the undesirable quantization change for the chroma blocks. The method also comprises encoding the set of video blocks based on a tested one of the quantization parameters.

In another example, this disclosure provides an apparatus that encodes video data, the apparatus comprising a video encoder that tests a first quantization parameter with respect to a set of video blocks for rate-distortion performance in video encoding, wherein the set of video blocks include luma blocks and chroma blocks, adjusts the first quantization parameter to a second quantization parameter, and determines whether the second quantization parameter causes an undesirable quantization change for the chroma blocks relative to the first quantization parameter. The video encoder tests the second quantization parameter with respect to the set of video blocks for rate-distortion performance in the video encoding if the second quantization parameter does not cause the undesirable quantization change for the chroma blocks, skips testing of the second quantization parameter with respect to the set of video blocks for rate-distortion performance in the video encoding if the second quantization parameter does cause the undesirable quantization change for the chroma blocks, and encodes the set of video blocks based on a tested one of the quantization parameters.

In another example, this disclosure describes a device that encodes video data, the device comprising means for testing a first quantization parameter with respect to a set of video blocks for rate-distortion performance in video encoding, wherein the set of video blocks include luma blocks and chroma blocks, means for adjusting the first quantization parameter to a second quantization parameter, means for determining whether the second quantization parameter causes an undesirable quantization change for the chroma blocks relative to the first quantization parameter, means for testing the second quantization parameter with respect to the set of video blocks for rate-distortion performance in the video encoding if the second quantization parameter does not cause the undesirable quantization change for the chroma blocks, means for skipping testing of the second quantization parameter with respect to the set of video blocks for rate-distortion performance in the video encoding if the second quantization parameter does cause the undesirable quantization change for the chroma blocks, and means for encoding the set of video blocks based on a tested one of the quantization parameters.

In another example, this disclosure describes a device comprising video encoder that tests a first quantization parameter with respect to a set of video blocks for rate-distortion performance in video encoding, wherein the set of video blocks include luma blocks and chroma blocks, adjusts the first quantization parameter to a second quantization parameter, determines whether the second quantization parameter causes an undesirable quantization change for the chroma blocks relative to the first quantization parameter, tests the second quantization parameter with respect to the set of video blocks for rate-distortion performance in the video encoding if the second quantization parameter does not cause the undesirable quantization change for the chroma blocks, skips testing of the second quantization parameter with respect to the set of video blocks for rate-distortion performance in the video encoding if the second quantization parameter does cause the undesirable quantization change for the chroma blocks, and encodes the set of video blocks based on a tested one of the quantization parameters. The device also comprises a wireless transmitter that sends the encoded set of video blocks to another device.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video encoding device cause the device to encode video data, wherein the instructions cause the device to test a first quantization parameter with respect to a set of video blocks for rate-distortion performance in video encoding, wherein the set of video blocks include luma blocks and chroma blocks, adjust the first quantization parameter to a second quantization parameter, determine whether the second quantization parameter causes an undesirable quantization change for the chroma blocks relative to the first quantization parameter, test the second quantization parameter with respect to the set of video blocks for rate-distortion performance in the video encoding if the second quantization parameter does not cause the undesirable quantization change for the chroma blocks, skip testing of the second quantization parameter with respect to the set of video blocks for rate-distortion performance in the video encoding if the second quantization parameter does cause the undesirable quantization change for the chroma blocks, and encode the set of video blocks based on a tested one of the quantization parameters.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes quantization parameter selection techniques that can be used during block-based video encoding. This disclosure recognizes and accounts for undesirable secondary effects that quantization parameter selections for luma blocks can have on the quantization of chroma blocks. Luma block quantization parameters map to corresponding chroma block quantization parameters. However, changes in luma block quantization parameters do not necessarily cause changes in chroma block quantization parameters. This disclosure proposes rules that may be applied during block-based video encoding to ensure that quantization parameter selections for luma blocks will not adversely affect the quality of chroma blocks.

The techniques of this disclosure may apply with respect to a rate-distortion algorithm that may be executed during video encoding. Rate-distortion testing refers to video encoding analysis of coded video blocks in order to define or balance the number of bits required for the encoding (i.e., the coding "rate") relative to the quality that is achieved (i.e., the level of "distortion"). Rate-distortion algorithms may balance these competing goals to achieve a desired balance of rate relative to distortion.

One way to balance rate and distortion is to adjust the so-called quantization parameter (sometime abbreviated "QP"), which is used to quantize data during the video encoding. Higher values for the quantization parameter typically result in more quantization, and thus less quality and a lower bit rate. In contrast, lower values for the quantization parameter typically result in less quantization, and thus higher quality and a higher bit rate. The manner and direction in which quantization parameter changes affect the quantization may vary in different standards. In this disclosure, it is assumed that higher values of quantization parameters correspond to lower levels of quality, although video coding standards or techniques could be defined such that higher values of quantization parameters correspond to higher levels of quality. In any case, in rate-controlled video coding, a video encoder may encode a set of video blocks using a first quantization parameter, adjust the quantization parameter to define a second quantization parameter, and the re-encode the set of video blocks using a second quantization parameter. The encoder may then analyze the level of rate and distortion associated with the different quantization parameters, and may select the quantization parameter that achieves a desirable balance of rate and distortion. The selected quantization parameter can define the actual encoding for that set of video blocks.

Sets of video blocks may refer to a set of luma and chroma video blocks that define a 16-by-16 area of pixels. These sets of video blocks are sometimes referred to as macroblocks. In particular, a macroblock may refer to a set of four 8-by-8 Y blocks, one sub-sampled 8-by-8 Cb block, and one sub-sampled 8-by-8 Cr block that collectively define a 16-by-16 block of pixels. In some formats, macroblocks can be partitioned into other luma and chroma block sizes, and may define even finer block-partitions such as 2-by-2 blocks, 2-by-4 blocks, 4-by-2 blocks, 4-by-4 blocks, 4-by-8 blocks, 8-by-4 blocks, and so forth. The techniques of this disclosure may apply with respect to a set of video blocks that collectively define a macroblock comprising a 16-by-16 area of pixels.

Rate-controlled video encoding by selecting and adjusting the quantization parameter typically considers luma blocks, but may ignore secondary effects on the coding of chroma blocks. This is due to the fact that quantization parameters for luma blocks typically map to corresponding quantization parameters for chroma blocks. Since chroma blocks are typically sub-sampled and do not have as much significance to the encoding quality as luma blocks, quantization changes in chroma blocks may be less significant to video quality than quantization changes in chroma blocks. For this reason, rate-controlled coding often adjusts quantization parameters for luma blocks without considering the secondary effects that such changes can have on chroma blocks. Indeed, the effects of quantization changes in chroma blocks due to changes in quantization parameters for luma blocks may be noticeable. In some cases, a quantization change in luma blocks often does not result in any quantization change for chroma blocks. In other cases, however, a quantization change for chroma blocks does result as a consequence of a quantization change in luma blocks.

In accordance with this disclosure, rate-controlled video encoding occurs in which quantization parameter changes in luma blocks are pre-evaluated to determine whether such quantization parameter changes in luma blocks will also cause quantization changes for chroma blocks. If quantization parameter changes in the luma blocks will also cause undesirable quantization changes for chroma blocks, then that quantization parameter change for the set of video blocks may be skipped and not evaluated. In this way, secondary effects of quantization parameter changes in the luma blocks (with respect to the chroma blocks) can be avoided. Moreover, the need to execute block-based coding with respect to a set of blocks in which the quantization parameter changes in the luma blocks will also cause quantization changes for chroma blocks may be avoided. A quantization changes for chroma blocks may be considered undesirable anytime the quantization changes for chroma blocks results in more quantization, and thus, lower quality in the encoding. Any quantization changes that result in less quantization, and thus, higher quality in the encoding may be allowed as these changes are desirable to improve the video quality.

There are at least two cases where a change from a first luma quantization parameter to a second luma quantization parameter will not cause quantization changes for chroma blocks. In these two cases, the second luma quantization parameter (i.e., the changed quantization parameter) can be evaluated for possible use in rate-controlled video coding. In other cases, however, where luma quantization parameter changes adversely effect quantization of chroma blocks, evaluation of the luma quantization parameter changes may be skipped during rate-controlled video coding so that secondary effects of quantization (i.e., undesirable changes in the quantization of chroma blocks) may be avoided.

In the first case where luma quantization parameter changes do not affect chroma block quantization, the first luma quantization parameter may map to a chroma quantization parameter, and the second luma quantization parameter may map to that same chroma quantization parameter. In this case, no secondary effects on chroma block quality will occur due to changes in the luma quantization parameter since the chroma quantization parameter does not change, and therefore, evaluation of the second luma quantization parameter may be allowed to occur during rate-controlled video coding.

In the second case, chroma blocks may not have any significant (non-zero) coefficients. In this second case, any upward changes in chroma quantization parameters will be irrelevant to chroma block quantization insofar as all coefficients are already zero and upward changes in chroma quantization parameters would only cause more quantization. Accordingly, in this second case, no secondary effects on chroma block quality will occur due to upward changes in the luma quantization parameter, and therefore, evaluation of the second luma quantization parameter may be allowed during rate-controlled video coding.

It should also be noted that secondary effects in the chroma quantization parameter that actually improve chroma encoding are not undesirable. Therefore, if the chroma quantization parameter becomes smaller (e.g., improves) based on a luma quantization parameter change, the secondary effects may result in coding improvements that are desirable. In this case, testing of changed quantization parameters should occur even though luma quantization parameter changes affect chroma quantization parameters. In other words, the techniques of this disclosure may impose restraints on degradation of chroma quantization parameters, but may allow secondary effects that cause improvements of chroma quantization parameters.

Figure 1:
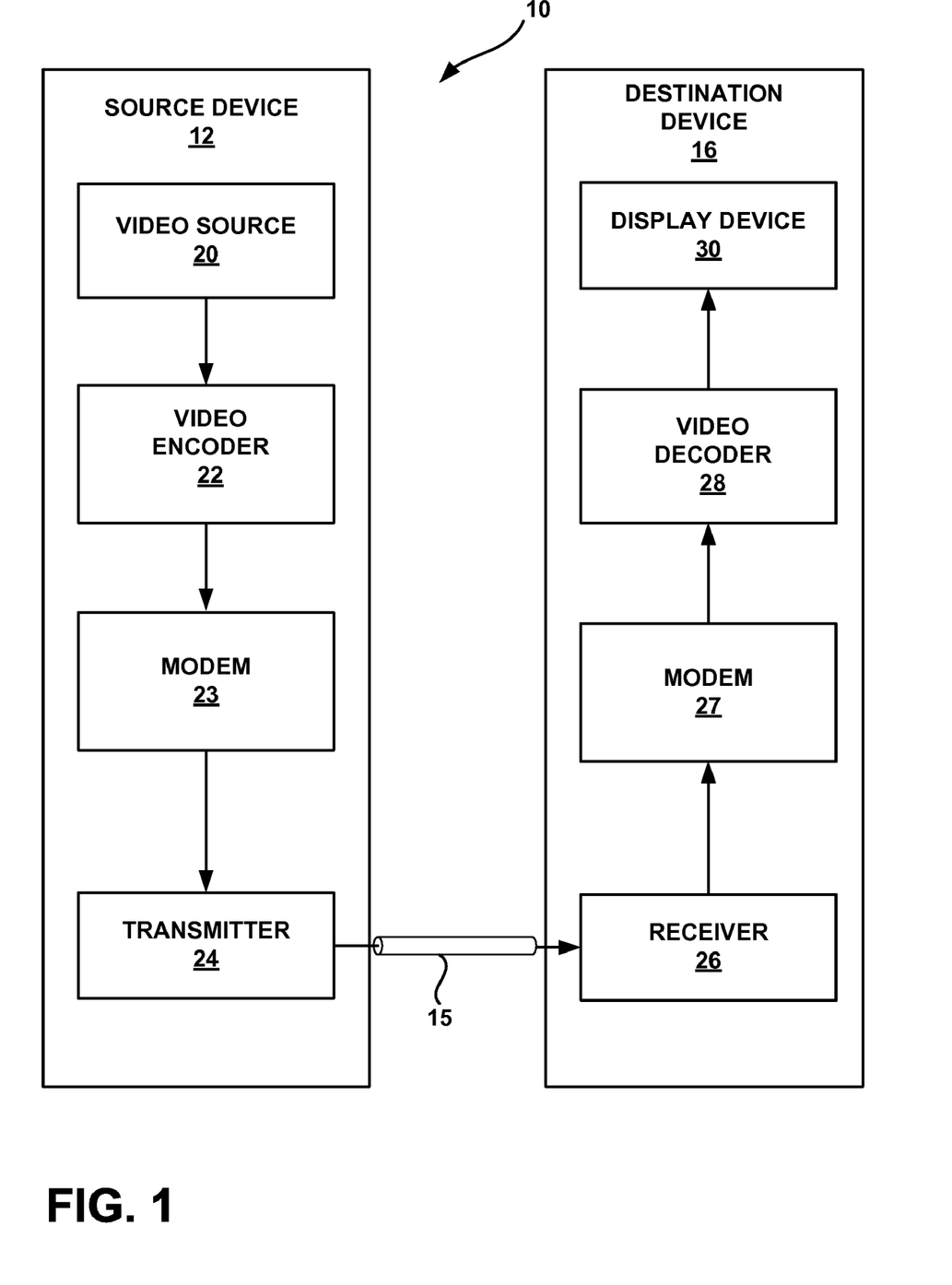
FIG. 1 is an exemplary block diagram illustrating a video encoding and decoding system.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to video encoding, are not necessarily limited to wireless applications or settings, and may be applied to non-wireless devices including video encoding capabilities.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to perform rate-controlled video encoding according to a block-based encoding methodology. Video encoder 22 may implement the techniques of this disclosure to skip the testing or evaluation of coding at one or more luma quantization parameters based on a determination that luma quantization parameter changes will cause undesirable changes in quantization of chroma blocks.

Video decoder 28 of destination device 16 may be configured to perform the reciprocal decoding techniques relative to video encoder 22. In any case, the illustrated system 10 of FIG. 1 is merely exemplary. Again, the rate-controlled video encoding techniques of this disclosure may be performed by any encoding device, and source device 12 is merely one example of an encoding device that can implement such techniques.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA) or another communication standard or technique, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antenna.

Receiver 26 of destination device 16 receives information over channel 15, and modem 27 demodulates the information. Video decoder 28 decodes the demodulated information and display device 30 displays decoded video data to a user. Display device 30 may comprise any of a variety of display devices such as a cathode ray tube (CRT), a liquid crystal display (LCD), a plasma display, an organic light emitting diode (OLED) display, or another type of display device.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard such as the ITU-T H.264 standard, alternatively referred to as MPEG-4, Part 10, Advanced Video Coding (AVC). However, the techniques of this disclosure may be readily applied to any of a variety of other video coding standards. Specifically, any standard that allows for rate-controlled, block-based video encoding via quantization parameter adjustments may benefit from the teachings of this disclosure.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or steps. In general, video encoder 22 operates on video blocks within individual video frames (or other independently coded units such as slices) in order to encode the video blocks. The video blocks may have fixed or varying sizes, and may differ in size according to a specified coding standard. In some cases, each video frame may include a series of independently decodable slices, and each slice may include a series of macroblocks, which may be arranged into even smaller blocks. Macroblocks typically refer to 16-by-16 blocks of data, which may be broken into a set of luma and chroma blocks. The ITU-T H.264 standard supports intra prediction in various block sizes, such as 16-by-16, 8-by-8, or 4-by-4 for luma blocks, and 8-by-8 for chroma components, as well as inter prediction in various block sizes, such as 16-by-16, 16-by-8, 8-by-16, 8-by-8, 8-by-4, 4-by-8 and 4-by-4 for luma components and corresponding scaled sizes for chroma components. In this disclosure, the term video blocks refers to any size of video block, including luma blocks and chroma blocks. Video blocks may refer to blocks of video data in the pixel domain, or blocks of data in a transform domain such as discrete cosine transform (DCT) domain.

Video encoder 22 may perform predictive coding in which a video block being coded is compared to a predictive frame (or other coded unit) in order to identify a predictive block. The differences between the current video block being coded and the predictive block are coded as a residual block, and prediction syntax is used to identify the predictive block. The residual block may be transformed and quantized. Transform techniques may comprise a discrete cosine transform (DCT) or conceptually similar process, integer transforms, wavelet transforms, or other types of transforms. In a DCT process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient.

According to this disclosure, the block-based coding loop may be performed for a set of video blocks with respect to a first quantization parameter, and possibly with respect to other quantization parameters. Again, this disclosure proposes rules that may be applied by encoder 22 to determine when a second quantization parameter should be considered and when the evaluation or testing of a second quantization parameter should be skipped or avoided due to undesirable secondary effects of the quantization change.

Following transform and quantization and once a quantization parameter has been selected for use in the actual encoding, encoder 22 may perform entropy coding on the quantized and transformed residual video blocks. Syntax elements may also be included in the entropy coding. In general, entropy coding comprises one or more processes that collectively compress a sequence of quantized transform coefficients. Scanning techniques, such as zig-zag scanning techniques, are performed on the quantized transform coefficients in order to define one or more serialized one-dimensional vectors of coefficients from two-dimensional video blocks. The scanned coefficients are then entropy coded, e.g., via content adaptive variable length coding (CAVLC), context adaptive binary arithmetic coding (CABAC), or another entropy coding process.

Figure 2:
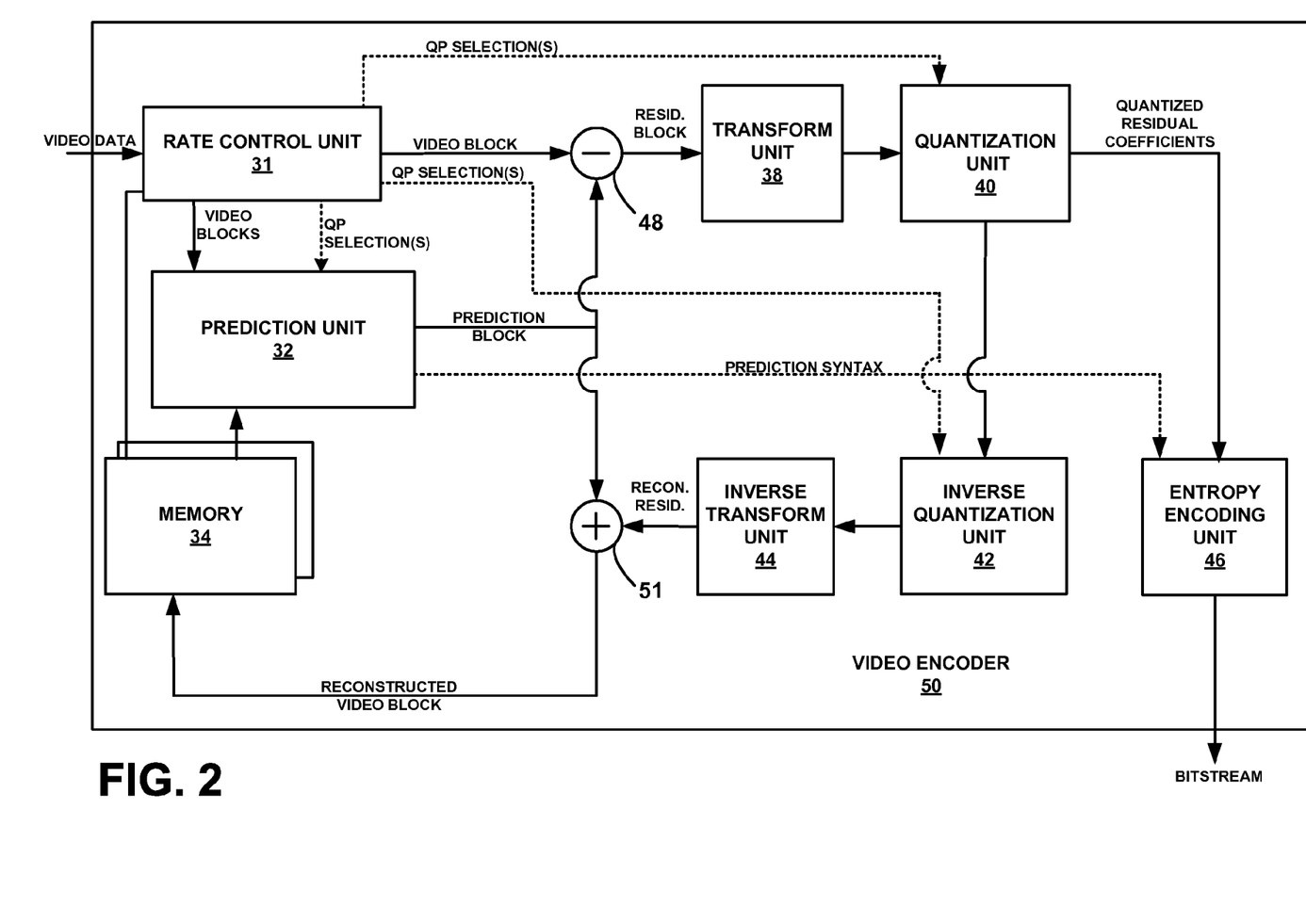
FIG. 2 is a block diagram illustrating an exemplary video encoder consistent with this disclosure.

FIG. 2 is a block diagram illustrating a video encoder 50 consistent with this disclosure. Video encoder 50 may correspond to video encoder 22 of device 12, or a video encoder of a different device. As shown in FIG. 2, video encoder 50 comprises a rate control unit 31, a prediction unit 32, and a memory 34. Video encoder 50 also includes a transform unit 38 and a quantization unit 40, as well as inverse quantization unit 42, inverse transform unit 44 and adders 48 and 51. Finally, video encoder 50 also includes an entropy coding unit 46.

In accordance with this disclosure, rate-control unit 31 performs quantization parameter selection techniques that recognize and account for secondary effects that quantization parameter selections for luma blocks can have on the quantization of chroma blocks. Rate-control unit 31 executes rules during block-based video coding by prediction unit 32 to ensure that quantization parameter selections for luma blocks will not adversely affect the quality of chroma blocks.

Rate-control unit 31 may execute a so-called rate-distortion algorithm that performs rate-distortion testing of coded video blocks at different levels of quantization. Rate control unit 31 may analyze coded video blocks stored in memory 34 in order to define or balance the number of bits required for the encoding (i.e., the "rate") relative to the quality that is achieved (i.e., the level of "distortion"). A set of video blocks may be encoded based on different quantization parameters, and rate-control unit 31 can examine the encoding quality of reconstructed video blocks in memory 34 in order to select the desired quantization parameter that yields the desired balance of rate and distortion.

In particular, rate-control unit 31 may balance rate and distortion by adjusting the so-called quantization parameter, which is used by quantization unit 40 to quantize data during the video encoding. Again, in this disclosure, it is assumed that higher values for the quantization parameter result in more quantization, and thus less quality and a lower bit rate. In contrast, lower values for the quantization parameter result in less quantization, and thus higher quality and a higher bit rate. In some standards, however, lower values for the quantization parameter might result in more quantization, in which case the techniques of this disclosure would simply be modified to address this fact. Anytime quantization changes in luma blocks results in a secondary effect that causes a decrease in the quality of chroma blocks, that quantization change with respect to luma blocks should be skipped and not analyzed for rate-distortion performance.

At the direction of rate control unit 31, prediction unit 32, adder 48, transform unit 38 and quantization unit 40 may encode a set of video blocks using a first quantization parameter. Inverse quantization unit 42, inverse transform unit 44 and adder 51 may reconstruct the encoded set of video blocks and store the results in memory 34. Rate-control unit 31 may then adjust the quantization parameter to define a second quantization parameter, and cause the components of video encoder 50 to re-encode the set of video blocks using a second quantization parameter. Rate-control unit 31 may analyze the level of rate and distortion of coded data in memory 34 in order to make decisions about what quantization parameter should be used for the actual video encoding. Rate-control unit 31 may select the quantization parameter that achieves a desirable balance of rate and distortion, and the selected quantization parameter can define the actual encoding for that set of video blocks.

Again, a set of video blocks may refer to a set of luma and chroma video blocks that define a 16-by-16 area of pixels. These sets of video blocks are sometimes referred to as macroblocks. In particular, a macroblock may refer to a set of four 8-by-8 Y blocks, one sub-sampled 8-by-8 Cb block, and one sub-sampled 8-by-8 Cr block that collectively define a 16-by-16 block of pixels. Y represents luminance, and Cb and Cr represent two different values of chrominance of a three-dimensional YCbCr color space. In some formats, macroblocks can be partitioned into other luma and chroma block sizes, and may define even finer block-partitions such as 2-by-2 blocks, 2-by-4 blocks, 4-by-2 blocks, 4-by-4 blocks, 4-by-8 blocks, 8-by-4 blocks, and so forth.

Rate-controlled video encoding by selecting and adjusting the quantization parameter typically considers luma blocks, but may ignore secondary effects on the coding of chroma blocks. This is due to the fact that quantization parameters for luma blocks typically map to corresponding quantization parameters for chroma blocks. Since chroma blocks are typically sub-sampled and do not have as much significance to the encoding quality as luma blocks, quantization changes in chroma blocks may be less significant to video quality than quantization changes in chroma blocks. Still, the effects of quantization changes in chroma blocks may be noticeable. In some cases, a quantization change in luma blocks does not result in any quantization change for chroma blocks. In other cases, a quantization change for luma blocks does result in response to a quantization change in chroma blocks. If this quantization change for luma blocks adversely changes the quantization in chroma blocks, the change should be skipped and not evaluated by rate-control unit 31.

In accordance with this disclosure, rate-control unit 31 pre-evaluates quantization parameter changes in luma blocks to determine whether such quantization parameter changes in luma blocks will also cause undesirable quantization changes for chroma blocks. If quantization parameter changes in the luma blocks will also cause undesirable quantization changes for chroma blocks, then rate-control unit 31 may cause that luma quantization parameter to be skipped and not evaluated in video encoder 50. Accordingly, in this case, the encoding of the set of video blocks according to a changed quantization parameter can be skipped because secondary effects would otherwise occur. In this way, secondary effects of quantization parameter changes in the luma blocks (with respect to the chroma blocks) can be avoided. Moreover, the need for prediction unit 32, adder 48, transform unit 38 and quantization unit 40 to execute block-based coding may be avoided, in this case, with respect to a set of blocks in which the quantization parameter changes in the luma blocks will also cause quantization changes for chroma blocks.

As mentioned above, there may be two cases where a change from a first luma quantization parameter to a second luma quantization parameter will not cause quantization changes for chroma blocks. In these two cases, rate-control unit 31 can evaluate the second luma quantization parameter (i.e., the changed quantization parameter) for possible use in rate-controlled video coding. In one example, the first luma quantization parameter may map to a chroma quantization parameter, and the second luma quantization parameter may map to that same chroma quantization parameter. In this case, no secondary effects on chroma block quality will occur due to changes in the luma quantization parameter since the chroma quantization parameter does not change, and therefore, rate-control unit 31 can evaluate coding of the set of video blocks when the second luma quantization parameter is used.

In another example, chroma blocks may not have any significant (non-zero) coefficients. In this second case, any upward changes in chroma quantization parameters will be irrelevant insofar as all coefficients are already zero and upward changes in chroma quantization parameters would only cause more quantization. Accordingly, in this second case, no secondary effects on chroma block quality will occur due to changes in the luma quantization parameter, and therefore, rate-control unit 31 may evaluate the second luma quantization parameter during rate-controlled video coding.

Also, if quantization changes in luma blocks actually improve quantization in the chroma blocks, then these changes may be considered for rate-distortion performance. The techniques of this disclosure concern the secondary effects that changes in quantization of luma blocks may have on chroma blocks, but if such changes actually improve chroma encoding, these secondary effects are typically not problematic.

The evaluation and testing of quantization parameters may involve a substantial or complete portion of the encoding of the video blocks. For example, testing a first quantization parameter with respect to the set of video blocks for rate-distortion performance in video coding may comprise encoding the luma blocks of the set of video blocks based on the first quantization parameter, and evaluating rate-distortion performance associated with the encoding of the luma blocks of the set of video blocks based on the first quantization parameter. In other examples, however, testing of quantization parameter may not necessarily involve a full encoding process of the luma blocks. Estimations of the rate-distortion performance associated with the encoding of the luma blocks within the set of video blocks could alternatively be used to facilitate testing and/or evaluation of quantization parameters. Even if a substantially complete encode is performed during the testing process, entropy coding may be avoided until the quantization parameter is chosen and the testing process is complete.

A "coded block pattern" (sometimes abbreviated as a "CBP") may be used to determine whether or not chroma blocks may not have any significant (non-zero) coefficients. A coded block pattern may be viewed as a set of bits associated with each luma and chroma video block of a macro block. Thus, each luma and chroma video block may have an associated bit in the coded block pattern that defines whether or not any significant (non-zero) coefficients exist in each block. Rate-control unit 31 may evaluate coded block patterns in order to determine whether chroma blocks may not have any significant (non-zero) coefficients. If so, rate-control unit 31 may evaluate upwardly changed luma quantization parameters during rate-controlled video coding, even if the upwardly changed luma quantization parameters would cause upward changes in the chroma quantization parameters. For example, if the chroma data is already quantized to zero, any further quantization will not cause any significant visual changes to the chroma data. In this case, changes in luma quantization parameters can be tested knowing that such changes will not adversely affect data in corresponding chroma blocks.

There are many different ways of representing color information. In the RGB color space, a color image can be represented by a superimposition of red, green and blue images (or color planes). In video coding, the YCbCr color space is commonly used since it is a more efficient way to represent color video. The Y component is called luminance (or luma) and Cb and Cr are blue and red chrominance (chroma) components, respectively. In video coding standards, such as the ITU H.264 standard, Y, Cb and Cr video blocks are processed separately. Each of the video blocks are spatially or temporally predicted, transformed and quantized. The quantization parameter $QP_C$ for the chroma components is derived from the quantization parameter $QP_Y$ for the luma component and from the value of chroma_qp_index_offset, which is a defined offset.

As an illustrative example, the value of $QP_C$ can be determined by rate-control unit based on Table 1, below, by first computing the index $qP_I$ as:

$$qP_I = \text{Clip3}(0, 51, QP_Y + \text{chroma\_qp\_index\_offset})$$

If the index $qP_I$ is smaller than 30, then $QP_C$ is set equal to $qP_I$. If the index $qP_I$ is larger than 30, then $QP_C$ is set to the value listed in Table 1.

TABLE 1

| | $qP_I$ | | | | | | | | | | | | | | | | | | | | | | |
|---|---|---|---|---|---|---|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| $QP_C$ | $qP_I$ | 29 | 30 | 31 | 32 | 32 | 33 | 34 | 34 | 35 | 35 | 36 | 36 | 37 | 37 | 37 | 38 | 38 | 38 | 39 | 39 | 39 | 39 |

In order to increase coding efficiency, rate-control unit 31 can adjust quantization parameters to minimize a cost based on a rate-distortion function defined to balance rate versus distortion in different scenarios. A macroblock comprising a set of luma and chroma video blocks can be encoded multiple times using a range of $QP_Y$ values before choosing the $QP_Y$ that minimizes the rate-distortion cost. Rate-control unit 31 may use a "brute force" method that basically encodes and analyzes the results for macroblocks at different quantization parameters, or may implement one or more techniques to accelerate the "brute force" method, e.g., and avoid one or more encoding steps where it can be determined that a particular quantization parameter will not result in the best result. Estimations of the rate-distortion performance associated with the encoding of video blocks could alternatively be used to facilitate testing and/or evaluation of quantization parameters, rather than conducting a full "brute force" encoding process.

Sometimes, however, increasing $QP_Y$ penalizes the quality of the chroma component in a way that is not properly considered in the rate-distortion algorithm. For this reason, the techniques of this disclosure cause rate-control unit 31 to impose limitations to the $QP_Y$ increases so that the selection of a desired value for this parameter during rate control will have little or no impact on the chroma quality. Again, this disclosure assumes that quantization parameter increases result in more quantization and less quality, although similar techniques could apply for standards in which quantization parameter increases result in less quantization and more quality. In this later case, quantization decreases in luma rather than quantization increases in luma would be considered for secondary effects on chroma blocks.

From Table 1, it can be seen that some changes in the quantization parameter for luma blocks do not correspond to a change in the chroma quantization parameter. For example, the case of $qP_1$ increasing from 33 to 34, the chroma quantization parameter remains unchanged to the value of 32. Therefore, increasing $QP_Y$ under this circumstance will not sacrifice chroma quality. Furthermore, regardless of the changes in quantization parameter, if the coded block pattern already indicates that a given chroma block has all zero coefficients, increases to the chroma quantization parameter will not significantly reduce the quality of chroma video blocks.

Accordingly, for every luma $QP_Y$ change, rate control unit 31 can decide whether or not a new quantization parameter should be tested based on the following rule:

If the change in luma $QP_Y$ causes a chroma quantization parameter to become larger, and at the same time the coded block pattern corresponding to the initial quantization parameter has a non-zero bit for the chroma block or blocks, this quantization parameter change will not be tested for rate-distortion.

Thus, rate control unit 31 may cause the other components of video encoder 50 to test a first quantization parameter with respect to a set of video blocks for rate-distortion performance in video encoding, wherein the set of video blocks include luma blocks and chroma blocks. Rate control unit 31 may then adjust the first quantization parameter to a second quantization parameter, and determine whether the second quantization parameter causes a quantization change for the chroma blocks relative to the first quantization parameter. If the second quantization parameter does not cause an undesirable quantization change for the chroma blocks, rate control unit 31 may cause the other components of video encoder 50 to test the second quantization parameter with respect to the set of video blocks for rate-distortion performance in the video encoding. However, if the second quantization parameter does cause an undesirable quantization change for the chroma blocks, rate control unit 31 may cause the other components of video encoder 50 to skip testing of the second quantization parameter with respect to the set of video blocks for rate-distortion performance in the video encoding. Rate control unit 31 can then cause the components of video encoder 50 to encode the set of video blocks based on a tested one of the quantization parameters that results in acceptable rate-distortion performance.

The testing of the first quantization parameter with respect to the set of video blocks for rate-distortion performance in video coding may comprise encoding the set of video blocks based on the first quantization parameter, and evaluating rate-distortion performance associated with the encoding of the set of video blocks based on the first quantization parameter. Entropy coding may be avoided, however, at this testing phase. In other examples, estimations of the rate-distortion performance associated with the encoding of the set of video blocks could be used to facilitate testing and/or evaluation of quantization parameters without requiring a full block-based encoding process with respect to such video blocks.

Determining whether the second quantization parameter causes a quantization change for the chroma blocks may comprise determining whether the second quantization parameter causes a chroma quantization parameter increase relative to the first quantization parameter, and determining whether a coded block pattern associated with the set of video blocks tested for the first quantization parameter indicates that the chroma blocks lack non-zero data.

In accordance with this disclosure, testing of the second quantization parameter may occur when the second quantization parameter does not cause the chroma quantization parameter increase relative to the first quantization parameter, or the coded block pattern indicates that the chroma blocks lack non-zero data for the first quantization parameter. Skipping testing of the adjusted quantization parameter may occur when the second quantization parameter does cause the chroma quantization parameter increase relative to the first quantization parameter, and the coded block pattern for the first quantization parameter indicates that the chroma blocks include non-zero data. The case where quantization parameter adjustments cause downward adjustments in luma and chroma quantization parameters is not problematic if such downward adjustments would correspond to quality improvements.

Prediction unit 32 performs predictive coding techniques at the direction of rate control unit 31. For inter coding of video blocks, prediction unit 32 compares the video block to be encoded to various blocks in one or more video reference units (e.g., previous or subsequent frames or slices). The predicted data may be retrieved from memory 34. Prediction unit 32 may generate prediction syntax, such as motion vectors, which can be used to identify the prediction blocks used to code the current video blocks. Prediction unit 32 may comprise motion estimation and motion compensation units that identify a motion vector that points to a prediction block and generates the prediction block based on the motion vector. Typically, motion estimation is considered the process of generating the motion vector, which estimates motion of a predictive video block relative to a current block being coded. In particular, the motion vector may indicate the displacement of a predictive block within a predictive frame relative to the current block being coded within the current frame. Motion compensation is typically considered the process of fetching or generating the predictive block based on the motion vector determined by motion estimation. This prediction process may be performed for rate-distortion testing and for the actual encoding once a particular quantization parameter is chosen.

Transform unit 38 applies a transform, such as a discrete cosine transform (DCT) or a conceptually similar transform, to the residual block, producing a video block comprising residual transform block coefficients. Block transform unit 38, for example, may perform other transforms defined by the H.264 standard, which are conceptually similar to DCT. Alternatively, other types of transforms may be used, such as wavelet transforms or integer transforms.

Quantization unit 40 quantizes the residual transform coefficients based on the selected quantization parameters (e.g., which may differ for chroma and luma blocks) to further reduce bit rate. Quantization unit 40, for example, may limit the number of bits used to code each of the coefficients. After quantization, entropy encoding unit 46 encodes the quantized transform coefficients according to an entropy coding methodology, such as CAVLC or CABAC, to further compress the data. In particular, entropy encoding unit 46 may scan the video block into a linear vector of coefficients, and apply entropy coding to a set of coefficients that correspond to some or all of the coefficients of each video block. In this disclosure, entropy coding refers to any of a wide variety of entropy coding methodologies, such as content adaptive variable length coding (CAVLC), context adaptive binary arithmetic coding (CABAC), or other entropy coding methodologies.

Following the entropy coding by entropy encoding unit 46, the encoded video may be transmitted to another device or archived for later transmission or retrieval. The encoded video may comprise the entropy coded vectors and various syntax, which can be used by the decoder to properly configure the decoding process.

For both the rate-distortion testing process, and for the actual encoding process, inverse quantization unit 42 and inverse transform unit 44 apply inverse quantization and inverse transformation, respectively, to reconstruct the residual block in the pixel domain. Summer 51 adds the reconstructed residual block to the prediction block produced by prediction unit 32 to produce a reconstructed video block for storage in memory 34. If desired, the reconstructed video block may also go through a deblocking filter unit (not shown) before being stored in memory 34. The reconstructed video block may be used by prediction unit 32 as a reference block to inter-code a block in a subsequent video frame or as a weighed portion of a prediction block used for weighted prediction of blocks of a subsequent video frame. The reconstructed video block may also be examined by rate control unit 31 in order to assess the rate and distortion associated with video coding at the quantization parameter used for that reconstructed video block.

Figure 3:
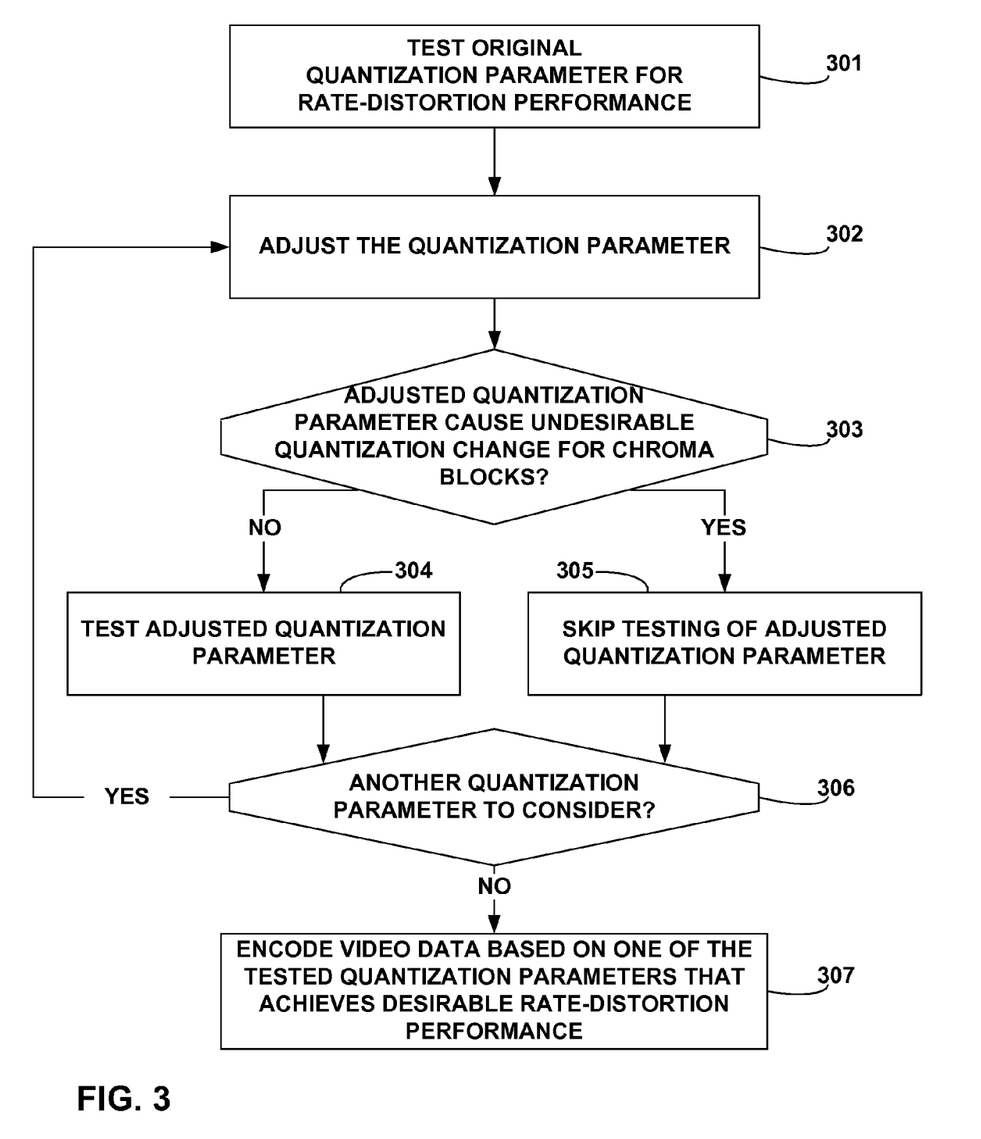
FIG. 3 is a flow diagram illustrating an encoding technique consistent with this disclosure.

FIG. 3 is a flow diagram illustrating an encoding technique consistent with this disclosure. As shown in FIG. 3, rate control unit 31 causes video encoder 50 to test an original quantization parameter for rate distortion performance (301). The original quantization parameter may comprise a default quantization parameter for luma blocks, or may comprise a quantization parameter that is defined in another way. In some cases, the original quantization parameter may be set based on the quantization parameter used in previous encoding of other video blocks, or possibly based on the quantization parameter used for similar video content that was previously encoded.

In order to test a quantization parameter for rate distortion performance, rate control unit 31 may forward one or more quantization parameters associated with original default quantization parameter to prediction unit 32 and quantization unit 40. The original default quantization parameter may be associated with luma blocks of a set of video blocks, and rate control unit 31 may map the original default quantization parameter for luma blocks to a corresponding quantization parameter for chroma blocks.

In order to test the original quantization parameter, prediction unit 32 may perform predictive-based coding for a set of video blocks, which may include luma and chroma video blocks. For each video block in this testing phase, a prediction block is subtracted from the original video block by adder 48. Transform unit 38 transforms the result, and quantization unit 40 quantizes the transform coefficients based on the quantization parameter associated with the given video block. This encoded data is then reconstructed by inverse quantization unit 42, inverse transform unit 44, adder 51, and possibly a de-blocking filter (not shown) before being stored in memory 34. Rate control unit 31 can analyze the encoded result in memory 34 in order to assess the amount of bits used (the rate) and the quality of the encoded data (the distortion) relative to the original data. In particular, rate control unit 31 may analyze the encoded luma blocks.

Rate control unit 31 can then adjust the quantization parameter for the set of video blocks (302). At this point, however, rate control unit 31 does not necessarily test the adjusted quantization parameter for rate-distortion performance. In particular, rate control unit 31 applies one or more rules in order to determine whether testing should be skipped for the adjusted quantization parameter.

As shown in the example of FIG. 3, rate control unit 31 determines whether the adjusted quantization parameter, which may comprise a luma quantization parameter, will cause an undesirable quantization change for chroma blocks (303). If so ("yes" 303), rate control unit 31 skips the testing of the adjusted quantization parameter, essentially skipping any encoding steps associated with the testing of the adjusted quantization parameter.

However, if rate control unit 31 determines that the adjusted quantization parameter will not cause a quantization change for chroma blocks ("no" 303), rate control unit 31 tests the adjusted quantization parameter for rate-distortion performance. In this case, prediction unit 32 may perform predictive-based coding for a set of video blocks based on the adjusted quantization parameter, which may define quantization for luma blocks and may map to a level of quantization for chroma blocks. Again, as noted above, quantization changes that actually improve chroma quantization are not undesirable, and therefore, may also be considered and evaluated. Thus, the technique of FIG. 3 may be assumed to make quantization adjustments that increase the level of quantization, and therefore, decrease quality of luma blocks with each subsequent adjustment to the quantization parameter. Any decreases in quantization may be allowed by rate-control unit 31 insofar as decreases in quantization would typically cause improvements in the luma and chroma coding, and therefore, secondary effects in this case would be beneficial and desirable.

For each video block in this testing phase, a prediction block is subtracted from the original video block by adder 48. Transform unit 38 transforms the result, and quantization unit 40 quantizes the transform coefficients based on the adjusted quantization parameter associated with the given video block. This encoded data is then reconstructed by inverse quantization unit 42, inverse transform unit 44, adder 51, and possibly a de-blocking filter (not shown) before being stored in memory 34. Rate control unit 31 can analyze the encoded result in memory 34 in order to assess the amount of bits used (the rate) and the quality of the encoded data (the distortion) relative to the original data. In particular, rate control unit 31 may analyze the encoded luma blocks at the adjusted quantization parameter relative to the rate and distortion of those same video blocks at the previous (e.g., default) quantization parameter.

This process may continue for several possible quantization parameters, and each subsequent quantization parameter may increase the level of quantization. As long as there is another quantization parameter to consider ("yes" 306), rate control unit 31 may adjust the current quantization parameter (302) and determine whether the adjusted quantization parameter will cause an undesirable quantization change for chroma blocks (303). Once every candidate quantization parameter is considered ("no" 306), video encoder 50 encodes the video data based on a tested one of the quantization parameters that achieves desirable rate-distortion performance (307). The video data may have already been encoded in the testing phase, so the encoded data may simply be selected, e.g., and forwarded to entropy encoding unit 46 for a final encoding stage that includes CABAC, CAVLC, or another type of entropy coding. The candidate quantization parameters, which are considered in this process of FIG. 3, may be pre-defined as part of the rate-distortion algorithm.

The techniques of this disclosure may be realized in a wide variety of devices or apparatuses, including a wireless handset, an integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASIC), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of encoding video data, the method comprising:
    testing a first quantization parameter with respect to a set of video blocks for rate-distortion performance in video encoding, wherein the set of video blocks include luma blocks and chroma blocks;
    adjusting the first quantization parameter to a second quantization parameter;
    determining whether the second quantization parameter causes an undesirable quantization change for the chroma blocks relative to the first quantization parameter;
    testing the second quantization parameter with respect to the set of video blocks for rate-distortion performance in the video encoding if the second quantization parameter does not cause the undesirable quantization change for the chroma blocks;
    skipping testing of the second quantization parameter with respect to the set of video blocks for rate-distortion performance in the video encoding if the second quantization parameter does cause the undesirable quantization change for the chroma blocks; and
    encoding the set of video blocks based on a tested one of the quantization parameters.

2. The method of claim 1, wherein the set of video blocks includes four 8-by-8 luma blocks and two sub-sampled 8-by-8 chroma blocks that define a 16-by-16 area of pixels.

3. The method of claim 1, wherein testing the first quantization parameter with respect to the set of video blocks for rate-distortion performance in video coding comprises:
    encoding the luma blocks of the set of video blocks based on the first quantization parameter; and
    evaluating rate-distortion performance associated with the encoding of the luma blocks of the set of video blocks based on the first quantization parameter.

4. The method of claim 1, wherein determining whether the second quantization parameter causes an undesirable quantization change for the chroma blocks comprises:
    determining whether the second quantization parameter causes a chroma quantization parameter increase relative to the first quantization parameter; and
    determining whether a coded block pattern associated with the set of video blocks tested for the first quantization parameter indicates that the chroma blocks lack non-zero data.

5. The method of claim 4, further comprising testing the second quantization parameter when:
    the second quantization parameter does not cause the chroma quantization parameter increase relative to the first quantization parameter; or
    the coded block pattern indicates that the chroma blocks lack non-zero data.

6. The method of claim 4, further comprising skipping testing the second quantization parameter when:
    the second quantization parameter causes the chroma quantization parameter to increase relative to the first quantization parameter; and
    the coded block pattern indicates that the chroma blocks include non-zero data.

7. The method of claim 1, wherein the first quantization parameter comprises a first luma quantization parameter that maps to a first chroma quantization parameter.

8. The method of claim 7, wherein the second quantization parameter comprises a second luma quantization parameter that maps to the first chroma quantization parameter, wherein testing of the second quantization parameter occurs because the second luma quantization parameter maps to a same chroma quantization parameter as the first luma quantization parameter.

9. The method of claim 7, wherein the second quantization parameter comprises a second luma quantization parameter that maps to a second chroma quantization parameter that is different from the first chroma quantization parameter, wherein skipping occurs because the second luma quantization parameter maps to a different chroma quantization parameter than the first luma quantization parameter.

10. An apparatus that encodes video data, the apparatus comprising a video encoder that:
- tests a first quantization parameter with respect to a set of video blocks for rate-distortion performance in video encoding, wherein the set of video blocks include luma blocks and chroma blocks;
- adjusts the first quantization parameter to a second quantization parameter;
- determines whether the second quantization parameter causes an undesirable quantization change for the chroma blocks relative to the first quantization parameter;
- tests the second quantization parameter with respect to the set of video blocks for rate-distortion performance in the video encoding if the second quantization parameter does note cause the undesirable quantization change for the chroma blocks;
- skips testing of the second quantization parameter with respect to the set of video blocks for rate-distortion performance in the video encoding if the second quantization parameter does cause the undesirable quantization change for the chroma blocks; and
- encodes the set of video blocks based on a tested one of the quantization parameters.

11. The apparatus of claim 10, wherein the set of video blocks include four 8-by-8 luma blocks and two sub-sampled 8-by-8 chroma blocks that define a 16-by-16 area of pixels.

12. The apparatus of claim 10, wherein in order to test the first quantization parameter with respect to a set of video blocks for rate-distortion performance in video encoding, the video encoder:
- encodes the luma blocks of the set of video blocks based on the first quantization parameter; and
- evaluates rate-distortion performance associated with the encoding of the luma blocks of the set of video blocks based on the first quantization parameter.

13. The apparatus of claim 10, wherein in order to determine whether the second quantization parameter causes the undesirable quantization change for the chroma blocks, the video encoder:
- determines whether the second quantization parameter causes a chroma quantization parameter increase relative to the first quantization parameter; and
- determines whether a coded block pattern associated with the set of video blocks tested for the first quantization parameter indicates that the chroma blocks lack non-zero data.

14. The apparatus of claim 13, wherein the video encoder tests the second quantization parameter when:
- the second quantization parameter does not cause the chroma quantization parameter increase relative to the first quantization parameter; or
- the coded block pattern indicates that the chroma blocks lack non-zero data.

15. The apparatus of claim 13, wherein the video encoder skips testing of the adjusted quantization parameter when:
- the second quantization parameter causes the chroma quantization parameter to increase relative to the first quantization parameter; and
- the coded block pattern indicates that the chroma blocks include non-zero data.

16. The apparatus of claim 10, wherein the first quantization parameter comprises a first luma quantization parameter that maps to a first chroma quantization parameter.

17. The apparatus of claim 16, wherein the second quantization parameter comprises a second luma quantization parameter that maps to the first chroma quantization parameter, and wherein the video encoder tests the second quantization parameter because the second luma quantization parameter maps to a same chroma quantization parameter as the first luma quantization parameter.

18. The apparatus of claim 16, wherein the second quantization parameter comprises a second luma quantization parameter that maps to a second chroma quantization parameter, and wherein the video encoder skips testing because the second luma quantization parameter maps to a different chroma quantization parameter than the first luma quantization parameter.

19. The apparatus of claim 10, wherein the apparatus comprises an integrated circuit.

20. The apparatus of claim 10, wherein the apparatus comprises a microprocessor.

21. A non-transitory computer-readable medium comprising instructions that upon execution in a video encoding device cause the device to encode video data, wherein the instructions cause the device to:
- test a first quantization parameter with respect to a set of video blocks for rate-distortion performance in video encoding, wherein the set of video blocks include luma blocks and chroma blocks;
- adjust the first quantization parameter to a second quantization parameter;
- determine whether the second quantization parameter causes an undesirable quantization change for the chroma blocks relative to the first quantization parameter;
- test the second quantization parameter with respect to the set of video blocks for rate-distortion performance in the video encoding if the second quantization parameter does not cause the undesirable quantization change for the chroma blocks;
- skip testing of the second quantization parameter with respect to the set of video blocks for rate-distortion performance in the video encoding if the second quantization parameter does cause the undesirable quantization change for the chroma blocks; and
- encode the set of video blocks based on a tested one of the quantization parameters.

22. The computer readable medium of claim 21, wherein the set of video blocks include four 8-by-8 luma blocks and two sub-sampled 8-by-8 chroma blocks that define a 6-by-16 area of pixels.

23. The computer readable medium of claim 21, wherein in order to test the first quantization parameter with respect to the set of video blocks for rate-distortion performance in video coding, the instructions cause the device to:
- encode the luma blocks of the set of video blocks based on the first quantization parameter; and
- evaluate rate-distortion performance associated with the encoding of the luma blocks of the set of video blocks based on the first quantization parameter.

24. The computer readable medium of claim 21, wherein in order to determine whether the second quantization parameter causes the undesirable quantization change for the chroma blocks, the instructions cause the device to:
- determine whether the second quantization parameter causes a chroma quantization parameter increase relative to the first quantization parameter; and determine whether a coded block pattern associated with the set of video blocks tested for the first quantization parameter indicates that the chroma blocks lack non-zero data.

25. The computer readable medium of claim 24, wherein the instructions cause the device to test the second quantization parameter when:
the second quantization parameter does not cause the chroma quantization parameter increase relative to the first quantization parameter; or
the coded block pattern indicates that the chroma blocks lack non-zero data.

26. The computer readable medium of claim 24, wherein the instructions cause the device to skip testing the second quantization parameter when:
the second quantization parameter causes the chroma quantization parameter to increase relative to the first quantization parameter; and
the coded block pattern indicates that the chroma blocks include non-zero data.

27. The computer readable medium of claim 21, wherein the first quantization parameter comprises a luma quantization parameter that maps to a first chroma quantization parameter.

28. The computer readable medium of claim 27, wherein the second quantization parameter comprises a second luma quantization parameter that maps to the first chroma quantization parameter, and wherein the instructions cause the device to test the second quantization parameter because the second luma quantization parameter maps to a same chroma quantization parameter as the first luma quantization parameter.

29. The computer readable medium of claim 27, wherein the second quantization parameter comprises a second luma quantization parameter that maps to a second chroma quantization parameter, and wherein the instructions cause the device to skip testing because the second luma quantization parameter maps to a different chroma quantization parameter than the first luma quantization parameter.

30. A device that encodes video data, the device comprising:
means for testing a first quantization parameter with respect to a set of video blocks for rate-distortion performance in video encoding, wherein the set of video blocks include luma blocks and chroma blocks;
means for adjusting the first quantization parameter to a second quantization parameter;
means for determining whether the second quantization parameter causes an undesirable quantization change for the chroma blocks relative to the first quantization parameter;
means for testing the second quantization parameter with respect to the set of video blocks for rate-distortion performance in the video encoding if the second quantization parameter does not cause the undesirable quantization change for the chroma blocks;
means for skipping testing of the second quantization parameter with respect to the set of video blocks for rate-distortion performance in the video encoding if the second quantization parameter does cause the undesirable quantization change for the chroma blocks; and
means for encoding the set of video blocks based on a tested one of the quantization parameters.

31. The device of claim 30, wherein the set of video blocks include four 8-by-8 luma blocks and two sub-sampled 8-by-8 chroma blocks that define a 16-by-16 area of pixels.

32. The device of claim 30, wherein means for testing the first quantization parameter with respect to the set of video blocks for rate-distortion performance in video coding comprises:
means for encoding the luma blocks of the set of video blocks based on the first quantization parameter; and
means for evaluating rate-distortion performance associated with the encoding of the luma blocks of the set of video blocks based on the first quantization parameter.

33. The device of claim 30, wherein means for determining whether the second quantization parameter causes the undesirable quantization change for the chroma blocks comprises:
means for determining whether the second quantization parameter causes a chroma quantization parameter increase relative to the first quantization parameter; and
means for determining whether a coded block pattern associated with the set of video blocks tested for the first quantization parameter indicates that the chroma blocks lack non-zero data.

34. The device of claim 33, further comprising means for testing the second quantization parameter when:
the second quantization parameter does not cause the chroma quantization parameter increase relative to the first quantization parameter; or
the coded block pattern indicates that the chroma blocks lack non-zero data.

35. The device of claim 33, further comprising means for skipping testing of the second quantization parameter when:
the second quantization parameter causes the chroma quantization parameter to increase relative to the first quantization parameter; and
the coded block pattern indicates that the chroma blocks include non-zero data.

36. The device of claim 30, wherein the first quantization parameter comprises a first luma quantization parameter that maps to a first chroma quantization parameter.

37. The device of claim 36, wherein the second quantization parameter comprises a second luma quantization parameter that maps to the first chroma quantization parameter, wherein means for testing the second quantization parameter tests the second quantization parameter because the second luma quantization parameter maps to a same chroma quantization parameter as the first luma quantization parameter.

38. The device of claim 36, wherein the second quantization parameter comprises a second luma quantization parameter that maps to a second chroma quantization parameter, wherein means for skipping skips testing because the second luma quantization parameter maps to a different chroma quantization parameter than the first luma quantization parameter.

39. A device comprising:
video encoder that:
tests a first quantization parameter with respect to a set of video blocks for rate-distortion performance in video encoding, wherein the set of video blocks include luma blocks and chroma blocks;
adjusts the first quantization parameter to a second quantization parameter;
determines whether the second quantization parameter causes an undesirable quantization change for the chroma blocks relative to the first quantization parameter;
tests the second quantization parameter with respect to the set of video blocks for rate-distortion performance in the video encoding if the second quantization parameter does not cause the undesirable quantization change for the chroma blocks;

skips testing of the second quantization parameter with respect to the set of video blocks for rate-distortion performance in the video encoding if the second quantization parameter does cause the undesirable quantization change for the chroma blocks; and encodes the set of video blocks based on a tested one of the quantization parameters; and a wireless transmitter that sends the encoded set of video blocks to another device.

40. The device of claim 39, wherein the device comprises a wireless communication handset.

* * * * *